United States Patent [19]
Thompson

[11] 3,932,994
[45] Jan. 20, 1976

[54] THERMAL ACTUATOR
[75] Inventor: Paige W. Thompson, Morrison, Ill.
[73] Assignee: General Electric Company, Fort Wayne, Ind.
[22] Filed: Feb. 6, 1974
[21] Appl. No.: 439,894

[52] U.S. Cl. ............... 60/531; 73/368.4; 236/68 A
[51] Int. Cl.² .................................................. F03G 7/06
[58] Field of Search ............ 60/531; 236/99 R, 68 A; 73/368, 368.4, 368.3

[56] References Cited
UNITED STATES PATENTS

| | | | |
|---|---|---|---|
| 896,526 | 8/1908 | Fournier | 73/368.4 |
| 921,308 | 5/1909 | Swan | 60/531 X |
| 1,983,314 | 12/1934 | Schultz | 60/531 |
| 2,212,281 | 8/1940 | Ullstrand | 60/531 X |
| 2,243,304 | 5/1941 | Young | 60/531 X |
| 2,368,101 | 1/1945 | Bottcher | 60/531 X |
| 2,433,493 | 12/1947 | Turner | 60/531 |

FOREIGN PATENTS OR APPLICATIONS

| | | | |
|---|---|---|---|
| 622,768 | 11/1935 | Germany | 236/68 A |
| 632,673 | 6/1936 | Germany | 236/68 A |
| 1,064,267 | 8/1959 | Germany | 236/68 A |

Primary Examiner—Martin P. Schwadron
Assistant Examiner—H. Burks, Sr.
Attorney, Agent, or Firm—Joseph E. Papin

[57] ABSTRACT

A thermal actuator has means for containing a vaporizable liquid and means for vaporizing the liquid. Means is provided for supplying only a portion of the liquid to the vaporizing means to affect vaporization thereof and for subjecting the remaining liquid in the containing means to the vapor established upon vaporization of the liquid portion by the vaporizing means. A method of driving a thermal actuator and an actuating system including a thermal actuator are also disclosed.

64 Claims, 5 Drawing Figures

THERMAL ACTUATOR

CROSS-REFERENCE TO RELATED PATENT APPLICATION

This application for patent is related generally to copending U.S. patent application Ser. Nos. 433,593 and 433,594 filed Jan. 15, 1974 which are specifically incorporated herein by reference.

BACKGROUND OF THE INVENTION

This invention relates generally to control devices as may be used in electrical switches or fluid valves or the like and in particular to thermal actuators, methods of driving such, and actuating systems in which such thermal actuators may be employed.

In the past, various thermal actuators and actuating systems in which such thermal actuators are incorporated have been provided. Most of the past thermal actuators, as illustrated for instance in U.S. Pat. No. 2,427,900, had a container or boiler with a vaporizable liquid therein adapted to be heated by various means well known in the art to vaporize the vaporizable liquid, and the boiler was communicated through a relatively small opening with an expansible chamber also filled with the vaporizable liquid and having a wall free to move in response to changing pressures. When the boiler and the liqid therein were heated in response to the occurrence of a certain condition to effect the vaporization of the liquid, the established vapor increased the pressure in the boiler forcing the liquid therefrom through the opening into the expansible chamber moving its movable wall for transmitting an actuating or output force to operated various electrical switch or fluid valve components. Of course, the boiler and expansible chamber were generally thermally insulated from each other thereby to effect cooling of the transferred liquid from the heated boiler to the relatively cooler environs of the expansible chamber, and upon termination of the heating of the boiler in response to the occurrence of another certain condition, the transferred liquid returned thereto effecting contraction or collapse of the expansible chamber thereby to eliminate the output force transmitted by the movable wall of the expansible chamber. One of the disadvantageous or undesirable features of the past thermal actuators was that it was necessary to heat the entire thermal mass of both the boiler and liquid therein to effect the vaporization of the liuqid for actuating the thermal actuating means. This, of course, resulted in the ancillary disadvantageous or undesirable feature of necessarily increasing the size and/or output of the means utilized to heat the thermal mass in order to attain operations of the thermal actuator at faster rates of response or speeds.

SUMMARY OF THE INVENTION

Amoung the several objects of the present invention may be noted the provision of thermal actuators, methods of driving a thermal actuator and actuating systems including a thermal actuator which overcome the disadvantageous or undesirable features mentioned hereinabove, as well as others, with respect to the prior art; the provision of such thermal actuators, methods, and actuating systems in which only a relatively small portion of a thermal mass constituted by a vaporizable liquid and container therefor is heated to effect vaporization of the liquid; the provision of such thermal actuators, methods, and actuating system in which a relatively small portion of the liquid is generally partitioned from the remaining liquid in its container and heated to effect the vaporization thereof; the provision of such thermal actuators, methods and actuating systems in which the container for the liquid may be formed from relatively thin, high strength steel; the provisions of such thermal actuators, methods, and actuating systems in which the thermal mass may be infinitely small; and the provisions of such thermal actuators and actuating systems which are simplistic in design, economically manufactured, and easily assembled. Other objects and advantageous features will be in part apparent and in part pointed out hereinafter.

In general, a method in one form of the invention is provided for driving a driven one of a pair of means for containing a varporizable liquid and communicating with each other in a thermal actuator. In this method, the liquid is deleivered from the other of the containing means to means exteriorly thereof for vaporizing the liquid, and the liquid delivered to the vaporizing means is vaporized upon the occurrence of a preselected condition. The vapor so created is delevered to the other containing means to act on the fluid therein and effect its displacement for driving the driven one of the containing means, and at least a part of the displaced liquid is utilized for replenishing at least in part the liquid vaporized by the vaporizing means.

Also in general, a method in one form of the invention is provided for operating a thermal actuator having one of a pair of means for containing a vaporizable fluid adapted to be driven by it. The steps of this method include: vaporizing at least a portion of the fluid generally in open fluid flow communication with means for vaporizing it; and subjecting the fluid in the other of the containing means to the vapor created during the vaporizing step for displacing the fluid from the other containing means to the one of the containing means to drive it and replenishing at least in part the liquid portion vaporized during the vaporizing step with another part of the fluid displaced from the other containing means.

Further in general, a method in one form of the invention is provided for operating a thermal actuator having one of a pair of means for containing a vaporizable liquid adapted to be driven by it. The steps of this method include: partitioning a portion of the liquid in the other of the containing means from the remaining liquid therein and providing fluid flow comminication between the liquid portion and the remaining liquid; vaporizing at least a part of only the liquid portion; and subjecting the remaining liquid to the vapor created the vaporizing step for displacing at least a part of the remaining liquid from the other containing means to the one of the containing means for driving it and replenishing the liquid portion with another portion of the remaining liquid to replace the at least part of the liquid portion upon the vaporization thereof during the vaporizing step.

Still in general, a method in one form of the invention is provided for making means for containing a vaporizable fluid and adapted for use in a thermal actuator. The steps of this method include: disposing within a chamber of the containing means means for partitioning a portion of the chamber from another portion thereof and providing at least limited fluid flow communication between the partitioned portion and the other portion generally below a selected fill level for the fluid adapted to be received in the chamber; and mounting to the containing means in a predetermined position with respect to the partitioned portion of the chamber means adapted for effecting vaporization of only the fluid received within the partitioned portion of the chamber.

Still further in general, another method in one form of the invention is provided for making means for containing a vaporizable fluid and adapted for use in a thermal actuator. The steps of this method includes: mounting to the containing means means for vaporizing the fluid adapted to be received in a chamber of the containing means with at least a part of the vaporizing means extending into the chamber; and disposing within the chamber generally loosely about the at least part of the vaporizing means therein means for partitioning a portion of the chamber from another portion thereof and for providing flow communication for the fluid adapted to be received in the chamber between the partitioned portion and the other portion thereof generally below a selected fluid fill level for the containing means.

In general and in one form of the invention, a thermal actuator has a pair of means for containing a vaporizable fluid and means for vaporizing the fluid delivered thereto. Means is provided for communicating the containing means and the vaporizing means and for delivering the fluid from one of the containing means to both the vaporizing means and the other of the containing means, the other containing means being driven in response to the fluid delivered thereto. Means is also provided for subjecting the fluid in the one containing means to the vapor established upon the vaporization of at least a part of the fluid delivered to the vaporizing means. The vapor acts on the fluid in the one containing means to effect the displacement of the fluid therefrom to the other containing means for driving it and also to the vaporizing means for replenishing at least in part the fluid vaporized thereby.

Also in general and in one form of the invention, another thermal actuator has means for containing a vaporizable fluid adapted to be displaced therefrom, and means is disposed within the containing means for partitioning a portion thereof from another portion of the containing means. Means is provided for communicating the partitioned portion and the other portion to maintain the respective levels of the fluid therein generally coextensive with each other at all times, and means is also provided for effecting the vaporization of only the fluid in the partitioned portion. The vapor created in response to the vaporization of only the fluid in the partitioned portion by the vaporization effecting means acts on the fluid to effect a flow of at least a part thereof from the other portion through the communicating means into the partitioned portion to replenish at least in part the fluid vaporized therefrom and to effect the displacement of at least another part of the fluid from the containing means.

In general, an actuating system in one form of the invention has a driven device and a pair of means for containing a vaporizable fluid and communicating in fluid flow relation with each other. Means is provided for vaporizing the fluid delivered thereto upon the occurrence of a preselected condition, and means is also provided for delivering the fluid from one of the containing means to the vaporizing means and subjecting the fluid in the one containing means to vapor established upon the vaporization of at least a part of the fluid delivered to by the vaporizing means. The vapaor acts on the fluid in the one containing means to effect the displacement of the fluid therefrom through the delivery and subjecting means to the vaporizing means for replenishing at least in part the fluid vaporized thereby and also to effect the displacement of the fluid from the one containing means to the other of the containing means. The other containing means includes means responsive to the fluid displaced from the one containing means to the other containing means for driving the driven device.

Also in general, another actuating system in one form of the invention has a driven device and a pair of means for containing a vaporizable fluid and generally in open fluid communication with each other. Means is disposed within one of the containing means for partitioning a portion thereof from another portion of the one containing means. Means is provided for communicating the fluid in the partoned portion of the one containing means with the fluid in the other portion thereof, and means is also provided for vaporizing only the fluid in the partitioned portion. The vapor created upon the vaporization of only the fluid in the partitioned portion by the vaporizing means acts on the fluid to effect a flow of at least a part thereof from the other portion into the partitioned portion to replenish at least in part the fluid vaporized therefrom and to effect a displacement flow of at least another part of the fluid from the one containing means to the other of the containing means. The other containing means includes means operable generally in response to the displacement flow of the at least another part of the fluid for driving the driven device.

The following examples illustrate the invention and are not to be construed as limiting in any manner.

DESCRIPTION OF THE PREFERRED EMBODIMENTS

Figure 1:
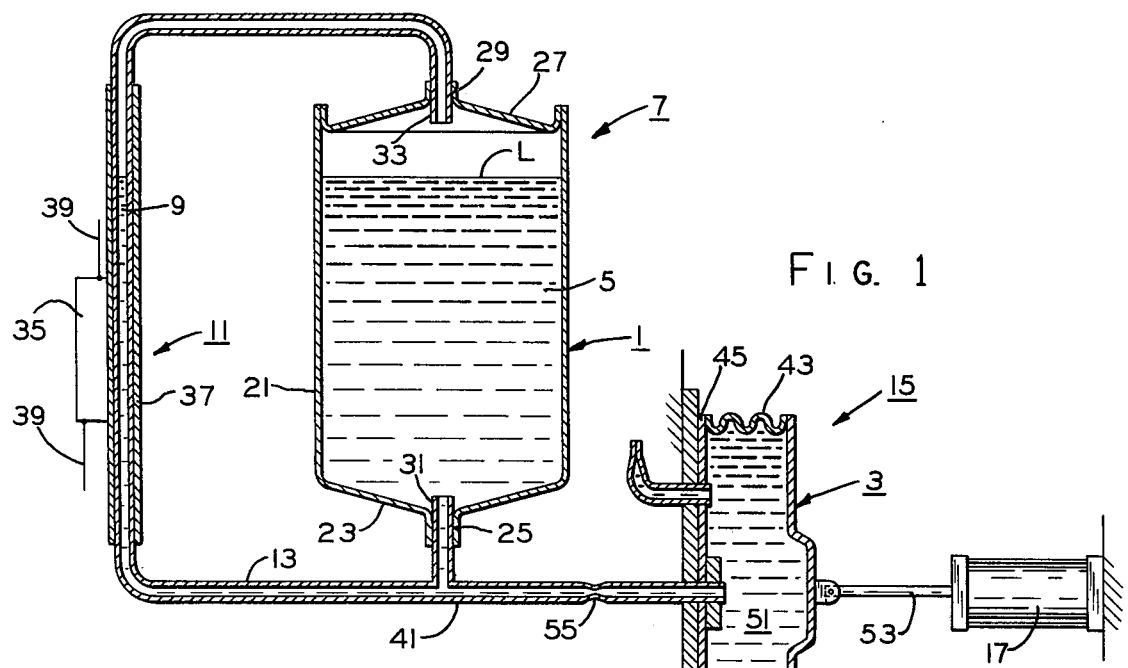
FIG. 1 is a sectional view of a thermal actuator in an actuating system therefor respectively in one form of the present invention and illustrating principles of a method of practicing the present invention also in one form thereof.
Figure 2:
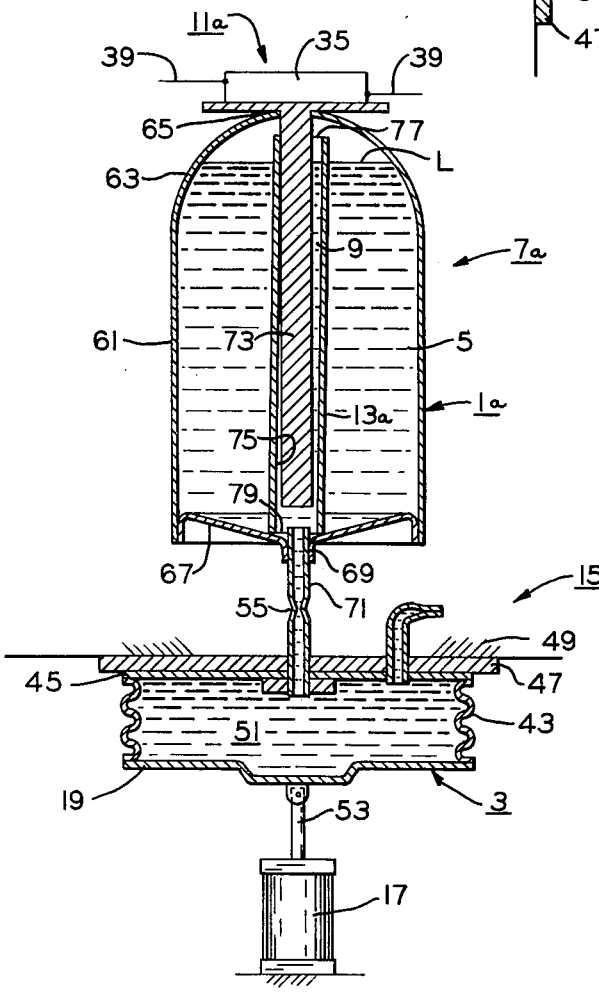
FIG. 2 is a sectional view of an alternative thermal actuator in an alternative actuating system therefor respectively in one form of the present invention and illustrating principles of an alternative metnod of practicing the present invention also in one form thereof.
Figure 3:
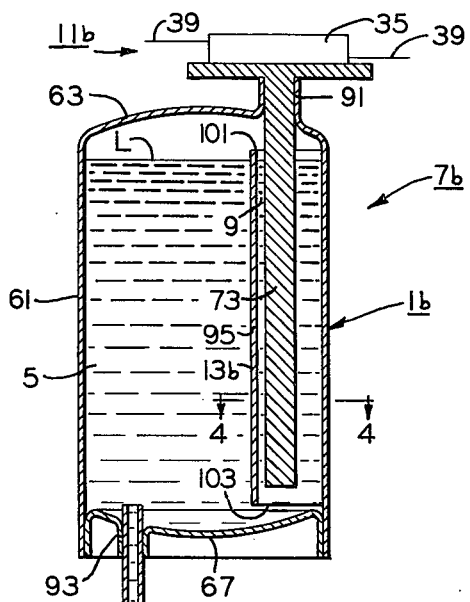
FIGS. 3 and 5 are sectional views of other alternative thermal actuators also embodying the present invention for use in the actuating system of FIG. 2.

Referring now in general to the drawings, a method in one form of the invention is illustrated for driving a driven one of a pair of means, such as bulbs 1, 1a, 1b and 1c (FIGS. 1–3 respectively) and a bellows 3, for containing a vaporizable liquid 5, such as an alcohol or other suitable vaporizable liquids well known in the art, and also communicated with each other in thermal actuators 7, 7a, 7b and 7c (FIGS. 1–3 respectively). In this method, only a portion, as indicated generally at 9, of liquid 5 in bulbs 1, 1a 1b, 1c is conducted to vaporizing means, indicated generally at 11, 11a, 11b and 11c (FIGS. 1–3 respectively) for vaporizing it, and the liquid portion is then vaporized by the vaporizing means under preselected conditions. The vapor so created upon the vaporization of liquid portion 9 is reacted on liquid 5 in bulbs 1, 1a, 1b, 1c to effect displacement thereof for driving bellows 3 and for replenishing, at least in part, the liquid portion vaporized by vaporizing means 11, 11a, 11b, 11c.

In this method, the volume or amount of liquid portion 9 is relatively small as compared with the total or original volume or amount of liquid 5 in bulbs 1, 1a, 1b, 1c and the volume or amount of the liquid displaced from the bulbs for replenishing the liquid portion upon the vaporization thereof is also relatively small as compared with the total volume of the liquid in the bulbs or even with that displaced to bellows 3. Further, the supply of liquid 5 for the replenishing of liquid portion 9 upon the vaporization thereof is desirably at a rate generally proportional to the rate of vaporization of the liquid portion until substantially all of the liquid is displaced from the bulbs 1, 1a, 1b, 1c. In this manner, the amount of liquid 5 available for ther replenishing of liquid portion 9 upon the vaporization thereof is reduced proportionally with the amount of the liquid displaced. Generally, it may be noted that the partitioning, at least in part, or general thermal isolation of liquid portion 9 for vaporization by vaporizing means 11, 11a, 11b, 11c, from the remaining liquid 5 in bulbs 1, 1a, 1b, 1c appreciably reduces the total thermal mass of thermal actuators 7, 7a, 7b, 7c which must be heated to effect vaporization of the liquid portion. Since bulbs 1, 1a, 1b are not heated upon the vaporization of liquid portion 9 but instead by the vapor itself, it may be desirable from a design, economic and assembly point of view to construct such bulbs from relatively thin, high strength steel or other metal of similar physical and thermal conductive characteristics. In this manner, the thermal mass of thermal actuators 7, 7a, 7b and 7c may be infinitely small, as compared with prior art thermal masses, the size being dictated only by the volume of liquid 5 necessary for a particular thermal actuator.

Further and in general, there is shown in FIGS. 1–3 thermal actuators 7, 7a, 7b, 7c, respectively, in one form of the invention which are respectively provided with means, such as bulbs 1, 1a, 1b, 1c for containing vaporizable liquid 5 and vaporizing means 11, 11a, 11b, 11c. Means, such as a conduit, partition or thermal isolator indicated at 13, 13a and 13b, supplies only liquid portion 9 to vaporizing means 11, 11a, 11b to effect vaporization thereof anad subjects the remaining liquid 5 in bulbs 1, 1a, 1b, 1c to the vapor established upon the vaporization of the liquid portion by the vaporizing means.

Further and still with general reference FIGS. 1–3, there is shown an actuating system, indicated generally at 15 and 15a, respectively, in one form of the invention having a driven device 17, such as an electrical switch or fluid valve or the like, and a pair of means, such as bulbs 1, 1a, 1b, 1c and bellows 3, for containing vaporizable liquid 5 and communicating with each other. Vaporizing means 11, 11a, 11b 11c is provided for vaporizing liquid 5 under preselected conditions, and means, such as conduits, or partitions 13, 13a, 13b, delivers only the liquid portion 9 to the vaporizing means 11, 11a, 11b, 11c and subjects the remaining liquid 5 in bulbs 1, 1a, 1b, 1c to vapor established upon vaporization of the liquid portion by the vaporizing means. The vapor acts on the reamining liquid 5 in bulbs 1, 1a, 1b, 1c to effect displacement thereof through conduits 13, 13a, 13b for replenishing, at least in part, vaporized liquid portion 9 and also to bellows 3, and the bellows includes means, such as a movable wall 19, responsive to the displaced liquid for driving driven device 17. As set out hereinafter, bulbs 1, 1a, 1b, 1c are, for purpose of discussion, disclosed as being partially filled with liquid 5; however, it is understood that the bulbs and also systems 15, 15a could be completely filled with the liquid which is contemplated as being within the scope of the invention.

More particularly and with reference now only to FIG. 1, bulb 1 of thermal actuator 7 is provided with a generally annular side wall 21 which is tapered at 23 to define an aperture 25, and a closure member or top 27 having another aperture 29 therein is secured to the side wall adjacent the upper end thereof by suitable means well known to the art, such as brazing or soldering (not shown). As previously mentioned, bulb 1 may be formed of relatively thin, high strength steel.

Conduit 13 is associated with vaporizing means 11 externally of bulb 1, and a pair of opposite or upper and lower ends or end portions 31, 33 of the conduit are secured within apertures 25, 29 of the bulb by suitable means, such as brazing or soldering (not shown), thereby to open into communication with the interior chamber of the bulb generally below and above a predetermined fill level L of liquid 5 therein, respectively. While bulb 1 is only partially filled with liquid 5, as illustrated by preselected liquid fill level L, it is contemplated that the bulb could be filled with liuid, as previously mentioned, to a fill level just beneath or generally coextensive with the opening in upper end portion 33 of conduit 13.

Vaporizing means 11 is provided with means, such as a positive temperature coefficient resistor (PTCR) 35, disposed in heat transfer relation with conduit 13 for heating only liquid portion 9 therein to a temperature effecting its vaporization, and thermal conductive means, such as a tube of metal or metallic foil 37 having relatively high heat transfer on conduction properties, is disposed about the conduit generally along a predetermined length thereof and vertically opposite bulb 1. PTCR 35 is connected in leads 39 of an electrical circuit (not shown) which is adapted to be energized under preselected conditions to effect the energization and resultant heating of the PTCR, as is well known in the art. It may be noted that the portion of conduit 13 along which conductive tube 37 extends is generally vertical and parallel with bulb 1, and the air space therebetween forms a thermal insulator or barrier generally preventing heat transfer from the conductive tube to the bulb. Furthermore, conductive tube 37 preferably extends along conduit 13 a length great enough to accommodate a generally commensurate reduction of the level of liquid portion 9 in the conduit with that of liquid 5 in bulb upon the occurrence of vaporization of the liquid portion, as discussed hereinafter. In this manner, sufficient heat transfer from PTCR 35 through conductive tube 37 is provided to liquid portion 9 irrespective of the level thereof in conduit 13.

Conduit 13 branches at 41, and the branch conduit 41 communcates bulb 1 with bellows 3. Bellows 3 is provided with an annular, expansible, resilient member 43 which is secured between movable member or end plate or wall 19 and a stationary member or end plate or wall 45 by suitable means, such as brazing or soldering (not shown), and the stationary end plate 45 and a bellows mounting plate 47 may be mounted by suitable means (not shown) to a support therefor shown schematically at 49. An expansible chamber 51 is defined in bellows 3 within expansible member 43 and between movable and stationary end plates 19, 45, and the chamber is adapted to be completely filled with liquid 5. To complete the description of thermal actuator 7, branch conduit 41 extends through support 49, mounting plate 47 and stationary end plate 45 into chamber 51, and the end of the branch conduit is secured to bellows stationary plate 45 by suitable means, such as soldering or brazing (not shown).

As previously mentioned, thermal actuator 7 is utilized in actuating system 15, and to this end, an acutuating, connection or drive link 53 is drivingly disposed between movable end plate 19 of bellows 3 and driven device 17 for effecting the driving actuation thereof. To complete the description of actuating system 15, means, such as an orifice or restriction 55, for preventing reverse surge of liquid 5 from bellows chamber 51 through branch conduit 55 is provided in branch conduit 41 between bellows 3 and bulb 1.

In the operation of thermal actuator 7 and actuating system 15 when PTCR 35 is energized under preselected conditions, heat is conductively transferred therefrom through conductive tube 37 at least to that portion of conduit 13 embraced thereby for heating only liquid portion 9. When the temperature necessary to effect vaporization of heated liquid portion 9 is attained, the vapor so created upon the vaporization of the liquid portion flows through conduit 13 and upper end portion 33 thereof generally from vaporizing means 11 into the upper end of bulb 1, and the expansion of the vapor effects a corresponding increase in pressure within thermal actuator 7. As previously mentioned, the heat of the vapor may be utilized to heat bulb 1. The pressure of the vapor in bulb 1 acts on liquid 5 therein to establish a force which effects displacement of the liquid from the bulb through lower end portion 31 of conduit 13 for replenishing, at least in part, liquid portion 9 in the conduit which is continuously being vaporized by vaporizing means 11 to increase the pressure of the vapor established upon such vaporization. Liquid 5 is also displaced from bulb 1 through branch conduit 41 into expansible chamber 51 of bellows 3 acting on the effective area thereof to establish an output force which moves movable end plate 19 of the bellows and drive link 53 in a direction to drivingly actuate driven device 17. It may be noted that the generally cyclical operation of thermal actuator 7 for replenishing the supply of liquid portion 9 upon the vaporization thereof to estabish vapor for displacing liquid 5 from bulb 1 will continue until the liquid portion in conduit 13 and the liquid in the bulb are coincidentally reduced to generally coextensive minimum levels. At this minimum level, liquid portion 9 in conduit 13 is generally adjacent to the lower end of conductive tube 37 thereby obviating the conduction of a sufficient amount of heat to the rather small volume of the liquid portion presented for heating; therefore, vaporization of the liquid portion is reduced to, in effect, stabilize actuating system 15.

During reset of thermal actuator 7 and actuating system 15 upon de-energization of PTCR 35 under other preselected conditions, the vapor in bulb 1 and conduit 15 begins to cool effecting condensation of a slight amount of vapor therein which results in a corresponding slight decrease of the pressure within the bulb. Upon this slight decrease of pressure in bulb 1, the relatively cooler liquid 5 in bellows 3 flows therefrom through branch conduit 41 and lower end portion 31 of conduit 13 returning to the bulb thereby to generally equalize the pressure between the bulb and the bellows. This return flow of relatively cooler liquid 5 causes immediate additional condensation in bulb 1 by chilling the vapor therein thus effecting further pressure differentials between bulb 1 and bellows 3 and causing more liquid return flow from the bellows to the bulb in an attempt to effect pressure equalization therebetween. In this manner, condensation of vapor in bulb 1 is rather rapid since the return flow of relatively cooler liquid 5 from bellows 3 continues to chill the vapor until the bulb is again filled to its fill level L. Of course, the rise in level of liquid portion 9 in conduit 13 is generally commensurate with that of liquid 5 in bulb 1, but since PTCR 35 is de-energized, vaporization of liquid portion 9 is obviated. To complete the description of the operation of thermal actuator 7 and actuating system 15, the pressure drop or reduction in the thermal actuator upon the return flow of relatively cooler liquid 5 to bulb 1, as previously described, creates a corresponding reduction in the output force of bellows 3 to effect de-actuation of driven device 17.

Referring now with particularity to FIG. 2, thermal actuator 7a and actuating system 15a are shown having generally the same component parts and functioning generally in the same manner as the previously described thermal actuator 7 and actuating system 15 with the following exceptions.

Bulb 1a of thermal actuator 7a is provided with an annular side wall 61 having an integrally formed, generally dome-shaped upper end portion 63, and an aperture 65 is centrally provided through the upper end portion 63. A closure or lower end member 67 having a centrally located aperture 69 therethrough is secured to side wall 61 of bulb 1a adjacent the lower end thereof by suitable means well known to the art, such as brazing or soldering (not shown), and as previously mentioned, component parts of the bulb may, if desired, be formed from relatively thin, high strength steel or other material of similar physical and thermal characteristics. A standpipe 71, which extends through bellows stationary end plate 45, mounting plate 47 and support 49 into bellows chamber 51, has its lower end secured to the bellows stationary end plate by suitable means, such as brazing or soldering (not shown), while the upper end of standpipe is secured within aperture 69 of bulb closure member 67 by the same suitable means (not shown). Orifice or restriction 55 is provided in standpipe 71 between bulb 1 and bellows 3.

Vaproizing means 11a includes a thermal conductor, such as a rod 73 of metal having relatively high heat transfer or conduction characteristics, which extends downwardly through aperture 65 in bulb upper end portion 63 and generally centrally into bulb 1a into heat transfer relation with liquid portion 9, as discussed hereinafter. The upper end of conductive rod 73 is secured within aperture 65 of bulb upper end portion 63 by suitable means, such as brazing or soldering (not shown), and means, such as PTCR 35, for heating the conductive rod is mounted on the upper end thereof externally of bulb 1a in heat transfer or conductive relation with the rod.

Conduit or partition 13a of preselected length consititutes a means for at least partially partioning or thermally isolating liquid portion 9 and at least a part of conductive rod 73 from the remaining liquid 5 in bulb 1a, and the conduit is preferably formed of a material having relatively great thermal insulating properties and which is generally compatible with the particular vaporizable liquid utilized in thermal actuator 7a. A bore or passage 75 is provided through conduit 13a having upper and lower openings or open end portions 77, 79 which communicate with bulb 1a generally aabove and beneath the preselected fill level L of liquid 5 in the bulb. Bore 75 of conduit 13a may be of any preselected diameter which is great enough to receive conductive rod 73 therein and accommodate the necessary amount or volume of liquid portion 9 between the conductive rod and the side wall of the conduit. While conduit 13a is shown as generally cylindric, other shapes are contemplated as being within the scope of the invention. Lower end portion 79 of conduit 13a is movably disposed on bulb closure member 67 extending about standpipe 71, and in this manner communication or flow is provided through the conduit lower end portion between liquid portion 9, which is generally confined within conduit bore 75, and the remaining liquid 5 in bulb 1a generally without conduit 13a. While conduit 13a is disclosed as being loosely or movably disposed within bulb 1a, it is contemplated than an eqivalent conduit could be fixedly disposed within the bulb with at least one opening through the side wall of the conduit communicating with the bulb above and/or below the predetermined liquid fill level thereof, i.e., to effect flow through the conduit for vaporization purposes. To complete the description of thermal actuator 7a and actuating system 15a, the levels of liquid portion 9 within bore 75 of conduit 13a and the remaining liquid 5 in bulb 1a remain generally coextensive with other and reduce generally coincidentally with each other.

In the operation of thermal 7a and actuating system 15a when PTCR 35 is energized under preselected conditions, heat is conductively transferred therefrom through conductive rod 73 to heat only liquid portion 9 within bore 75 of conduit 13a, and vapor effected upon vaporization of the liquid portion as discussed hereinafter. Insignificant heat conduction due to engagement of conduit 13a and closure member 67 or the like may occur. When the temperature necessary to effect vaporization of heated liquid portion 9 is attained, the vapor so created upon the vaporization of the liquid portion flows through bore 75 of conduit 13a and the open upper end portion 77 thereof into the upper end of bulb 1a, and the expansion of the vapor effects a corresponding increase in pressure within thermal actuator 7a. The pressure of the vapor in bulb 1a acts on liquid 5 therein to establish a force which effects displacement of the liquid from the bulb through the open lower end portion 79 of conduit 13a into bore 75 thereof for replenishing, at least in part, liquid portion 9 within the conduit bore which is continuously being vaporized by vaporizing means 11a to increase the pressure of the vapor established upon such vaporization. Liquid 5 is also displaced from bulb 1a through standpipe 71 to effect actuation of bellows 3 driven device 17 of actuating system 15a in the same manner as previously described with respect to thermal actuator 7 and actuating system 15.

It may be noted that the generally cyclical operation of thermal actuator 7a for replenishing the supply of liquid portion 9 within bore 75 of conduit 13a upon the vaporization of the liquid portion to estabish vapor for displacing the remaining liquid 5 from bulb 1a will continue until the liquid portion within the conduit bore and the remaining liquid in the bulb are coincidentally reduced to generally coextensive minimum levels. At this minimum level, liquid portion 9 within bore 75 of conduit 13a is generally adjacent conduit lower end portion 79 and the lower end of conductive rod 73 thereby to obviate the conduction of a sufficient amount of heat to the rather small volume of the liquid portion presented for heating; therefore, vaporization of the liquid portion by vaporizing means 11a is reduced to, in effect, stabilize actuating system 15a.

During reset of thermal actuator 7a and actuating system 15a upon de-energization of PTCR 35 under other preselected conditions, the vapor in bulb 1a begins to cool effecting condensation of a slight amount of vapor therein which results in a corresponding slight decrease of the pressure within the bulb. Upon this slight decrease of pressure in bulb 1a, the relatively cooler liquid 5 in bellows 3 flows therefrom through standpipe 71 returning to the bulb thereby to generally equalize the pressure between the bulb and the bellows. This return flow of relatively cooler liquid 5 causes immediate additional condensation in bulb 1a by chilling the vapor therein thus effecting further pressure differentials between bulb 1a and bellows 3 and causing more liquid return flow from the bellows to the bulb in an attempt to effect pressure equalization therebetween. In this manner, condensation of vapor in bulb 1a is rather rapid since the return flow of relatively cooler liquid 5 from bellows 3 continues to chill the vapor until the bulb is again filled to its fill level L. Of course, the rise in level of liquid portion 9 within conduit 13a is generally commensurate with that of the remaining liquid 5 in bulb 1a, but since PTCR 35 is de-energized, vaporization of liquid portion 9 is obviated. To complete the description of the operation of thermal actuator 7a and actuating system 15a, the pressure drop or reduction in the thermal actuator upon the return flow of relatively cooler liquid 5 to bulb 1a, as previously described, creates a corresponding reduction in the output force of bellows 3 to effect de-actuation of driven device 17.

Figure 4:
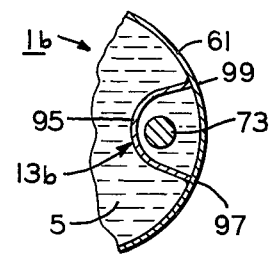
FIG. 4 is a sectional view taken along line 4—4 in FIG. 3; and Corresponding reference characters indicate corresponding parts throughout the several views of the drawings.

Referring now with particularity to FIGS. 3 and 4, thermal actuator 7b is shown having generally the same component parts and functioning in actuating system 15a generally on the same manner as the previously described thermal actuator 7a with the following exceptions.

In thermal actuator 7b, an aperture 91 is provided through upper end portion 63 of bulb 1b generally spaced adjacent to side wall 61 thereof, and another aperture 93 is provided through a closure member 67 of the bulb also spaced adjacent to the side wall thereof. Conductive rod 73 and standpipe 71 are respectively secured within apertures 91, 93 by suitable means, such as brazing or soldering (not shown) generally off-center with respect to bulb 1b. In thermal actuator 7b, conduit or partition 13b is constituted by a portion of a tube or duct or the like, indicated at 95, and a portion of side wall 61 of bulb 1b, and the duct has generally longitudinally extending side or end portions 97, 99 which are secured by suitable means, such as brazing or soldering (not shown), to the interior of side wall 61 of bulb 1b. Upper and lower ends 101, 103 of duct 95 are open for communicating with vapor and liquid 5, and upper end 101 is disposed above or at least generally coextensive with predetermined liquid fill level L. Conductive rod extends downwardly within duct 95 for heating liquid portion 9 therein, and the remaining liauid 5 in bulb 1c is generally without the duct but communicating through lower end 103 thereof with the liquid portion.

Figure 5:
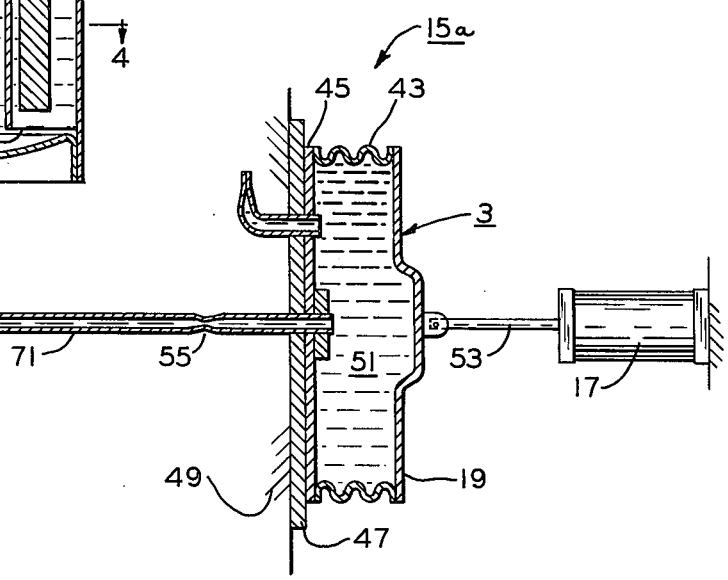
Figure 5:
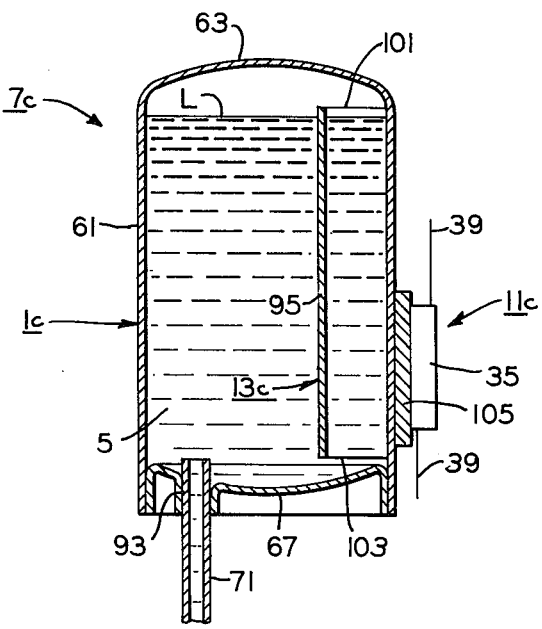

Referring now with particularity to FIG. 5, alternative thermal actuator 7c in one form of the invention is shown having substantially the same component parts and functioning in system 15a as the previously described thermal actuator 16 with the following exceptions.

In thermal actuator 1c, thermal conductive means, such as a metallic strip or disc 105 having relatively high thermal conductive characteristics, is disposed by suitable means, such as brazing or soldering (not shown), on side wall 61 of bulb 1c exteriorly thereof and immediately adjacent that part or portion of the side wall which, in combination with duct 95, constitutes partition or conduit means 13c. In vaporizing means 11c, PTCR 35 is disposed in thermal conducting or heat transfer relation with conductive strip so as to generally heat only liquid portion 9 within duct 95. While duct 95 and vaporizing means 11c are disclosed as mounted on side wall 61 of bulb 1c, they could also be mounted on an accommodating upper end wall 63 or closure member 67 of bulb 1c so that the bulb could be disposed on its side, i.e., generally horizontally as opposed to vertically (as seen in FIG. 5), and it is contemplated that this also would be within the scope of the invention.

From the foregoing, it is now apparent that novel thermal actuators 7, 7a, 7b, 7c, methods of driving such, and actuating systems 15, 15a are presented meeting the objects and advantageous features set out hereinbefore, as well as others, and that changes as to the precise arrangements, shapes and details of the component parts of the thermal actuators and actuating systems as well as the precise steps of the methods, which are presented to illustrate the invention, may be made by those skilled in the art without departing from the spirit of the invention or scop thereof as set out in the claims which follow.

What I claim as new and desire to secure by Letters Patent of the United States is:

1. A method of driving a driven one of a pair of means for containing a vaporizable liquid and communicating with each other in a thermal actuator comprising the setps of:
   a. deliving the liquid from the other of the containing means to means exteriorly thereof for vaporizing the liquid;
   b. vaporizing the liquid delivered to the vaporizing means upon the occurrence of a preselected condition; and
   c. delivering the vapor created during the vaporizing step to the other containing means to act on the fluid therein and effect its displacement for driving the driven one of the containing means and utilizing at least a part of the displaced liquid for replenishing at least in part the liquid vaporized by the vaporizing means.

2. The method as set forth in claim 1, wherein the amount of the at least part of the displaced liquid for replenishing the liquid vaporized is generally small with respect the entire amount of the displaced liquid.

3. The method as set forth in claim 1, wherein the delivering and utilizing step includes reducing the amount of the liquid available in the other containing means for replenishing the liquid vaporized generally proportionally with the amount of the displaced liquid.

4. The method as set forth in claim 1, wherein the delivering the utilizing step includes supplying the at least part of the displaced liquid for replenishing the liquid vaporized at a rate generally proportional to the rate of vaporizing the liquid during the vaporizing step until generally all of the liquid is displaced from the other containing means.

5. The method as set forth in claim 1, wherein the delivering step includes passing the liquid through means for carrying it disposed generally exteriorly of the other containing means to the vaporizing means for the vaporization of the liquid during the vaporizing step.

6. The method as set forth in claim 5, wherein the delivering and utilizing step includes returning the vapor created during the vaporizing step from the vaporizing means through the carrying means to the other containing means.

7. The method as set forth in claim 1, comprising the preliminary step of disposing conduit means externally of the other containing means in association with the vaporizing means with opposite ends of the conduit means communicating with the other containing means generally above and below a predetermined fill level of the liquid therein for the flow through the conduit means of the vapor and the at least part of the displaced liquid for the replenishing of the vaporized liquid, respectively.

8. The method as set forth in claim 7, wherein the vaporizing means includes means disposed in heat transfer relation with the conduit means generally along a predetermined length thereof for heating at least a part of the liquid within the conduit means to effect the vaporization thereof during the vaporizing step.

9. The method as set forth in claim 8, wherein the vaporizing step includes reducing the capacity of the vaporizing means to vaporize the liquid delivered thereto generally proportionally with the amount of the liquid displaced from the other containing means during the delivering and utilizing step.

10. A thermal actuator comprising a pair of means for containing a vaporizable fluid, means for vaporizing the fluid delivered thereto, means for communciating the containing means and the vaporizing means and for delivering the fluid from one of the containing means to both the vaporizing means and the other of displacement containing means, the other of the containing means being driven in response to the fluid delivered thereto, and means for subjecting the fluid in the one containing means to the vapor established upon the vaporization of at least a part of the fluid delivered to the vaporizing means, the vapor acting on the fluid in the one containing means to effect the displacemtn of the fluid therefrom to the other containing means for driving it and also to the vaporizing means for replenishing at least in part the fluid vaporized thereby.

11. A thermal actuator as set forth in claim 10, wherein the volume of the fluid delivered to the vaporizing means is relatively small as compared with the total volume of the fluid in the one containing means.

12. A thermal actuator as set forth in claim 10, wherein the communicating and delivering means includes a conduit having a portion connected with the one containing means generally below a predetermined fill level for the fluid thereof and another portion connected with the other containing means and the vaporizing means.

13. A thermal actuator as set forth in claim 10, wherein the subjecting means includes a conduit portion connected with the one containing means generally above a predetermined fill level for the fluid thereof and also communcating with the communicating and delivering means.

14. A thermal actuator as set forth in claim 10, wherein the vaporizing means comprises means disposed in heat transfer relation with a portion of the communicating and delivering means for heating the fluid delivered therethrough to the vaporizing means to a temperature effecting its vaporization.

15. A thermal actuator as set forth in claim 10, wherein the heating means includes thermal conductive means disposed at least generally adjacent the communicating and delivering means portion and extending along a preselected length therof.

16. A thermal actuator as set forth in claim 10, wherein the heating means further includes a PTCR disposed in thermal transfer relation with the thermal conductive means.

17. A thermal actuator comprising means for containing a vaporizable fluid adapted to be displaced therefrom, means disposed within the containing means for partitioning a portion thereof from another portion of the containing means, means for communicating the partitioned portion and the other portion to maintain the respective levels of the fluid therein generally coextensive with each other at all times, and means for effecting the vaporization of only the fluid in the partitioned portion, the vapor created in response to the vaporization of only the fluid in the partitioned portion by the vaporization effecting means acting on the fluid to effect a flow of at least a part thereof from the other portion through the communcating means into the partitioned portion to replenish at least in part the fluid vaporized therefrom and to effect the displacement of at least another part of the fluid from the containing means.

18. A thermal actuator as set forth in claim 17, wherein the partitioning means is formed of a thermal insulating material.

19. A thermal actuator as set forth in claim 17, further comprising means communciated with the first named containing means for receiving the fluid displaced therefrom including means movable for establishing an output force in response to the displaced fluid acting thereon.

20. A thermal actuator as set forth in claim 17, wherein the partitioning means comprises conduit means disposed within the containing means generally about at least a part of the vaporization effecting means, the partitioned portion being generally within the conduit means and the other portion of the contaging means being generally without the conduit means.

21. A thermal actuator as set forth in claim 20, wherein the conduit means is generally loosely mounted within the containing means for supporting engagement with the at least part of the vaporization effecting means.

22. A thermal actuator as set forth in claim 20, wherein the conduit means includes a pair of openings, the communicating means being generally constituted by one of the openings spaced below a predetermined fill level of the fluid in the containing means and the other of the openings being at least generally coextensive with the predetermined fill level for passing the vapor from the partitioned portion.

23. A thermal actuator as set forth in claim 20, wherein the conduit means generally thermally insulates the fluid in the other portion in the containing means from that in the partitioned portion.

24. A thermal actuator as set forth in claim 20, wherein the conduit means includes an end portion spaced below a predetermined fill level of the fluid in the containing means and disposed in supporting engagment with an adjacent part of the containing means as to define therewith the communicating means, the vapor acting on the fluid in the containing means to force the at least part of the fluid through the communicating means to effect the replenishment of the fluid vaporized from the partitioned portion within the conduit means by the vaporization effecing means.

25. A thermal actuator as set forth in claim 20, wherein the conduit means includes an end portion spaced above a predetermined fill level of the fluid in the containing means, the vapor passing from the conduit means through the end portion thereof to act on the fluid in the containing means upon the vaporization of the fluid within the partitioned portion by the vaporization effecting means.

26. A thermal actuator as set forth in claim 17, wherein the vaporization effecting means includes a thermal conductor mounted to the containing means and extending into the partitioned portion in heat transfer relation with the fluid therein.

27. A thermal actuator as set forth in claim 26, wherein the vaporization effecting means further includes means for heating the thermal conductor.

28. A thermal actuator as set forth in claim 27, wherein the heating means comprises a PTCR connected in heat transfer relation with the thermal conductor.

29. A thermal actuator as set forth in claim 17, wherein the partioning means defines with the containing means a passage for the fluid flow from the other portion to the partitioned portion, and the passage generally constituting the communicating means.

30. A thermal actuator as set forth in claim 17, wherein the containing means includes a sidewall, and the partitioning means comprises a duct mounted to the sidewall wherein the partitioned portion is generally defined between the duct and the sidewall of the containing means.

31. A thermal actuator as set forth in claim 30, wherein the duct has good thermal insulation properties thereby to generally thermally isolate the fluid within the partitioned portion from that in the other portion.

32. A thermal actuator as set forth in claim 30, wherein the vaporization effecting means includes a thermal conductor mounted to the containing means and extending into the partitioned portion in heat transfer relation only with the fluid thereof.

33. A thermal actuator as set forth in claim 32, wheren the vaporization effecting means further includes means for heating the thermal conductor.

34. A thermal actuator as set forth in claim 30, wherein the vaporization effecting means is mounted exteriorly of the containing means to a part of its sidewall defining with the duct the partitioned portion, the vaporization effecting means being operable generally to transmit heat through the sidewall part to effect the vaporization of only the fluid within the partitioned portion.

35. A thermal actuator as set forth in claim 30, wherein the duct includes a pair of openings, one of the openings being spaced below a predetermined fill level of the fluid in the containing means thereby to generally constitute the communicating means and the other of the openings being at least generally coextensive with the predetermined fill level for passing the vapor from the partitioned portion.

36. An actuating system comprising a driven device, a pair of means for containing a vaporizable fluid and communciating in fluid flow relation with each other, means for vaporizing the fluid delivered thereto upon the occurrence of a preselected condition, means for delivering the fluid from one of the containing means to the vaporizing means and subjecting the fluid in the one containing means to vapor established upon the vaporization of at least a part of the fluid delivered to by the vaporizing means, the vapor acting on the fluid in the one containing means to effect the displacement of the fluid therefrom through the delivery and subjecting means to the vaporizing means for replenishing at least in part the fluid vaporized thereby and also to effect the displacement of the fluid from the one containing means to the other of the containing means, and the other containing means including means responsive to the fluid displaced from the one containing means to the other containing means for driving the driven device.

37. An actuating system as set forth in claim 36, wherein the delivery and subjecting means includes conduit means having a pair of opposite portions respectively connected with the one containing means above and below a predetermined fill level of the fluid therein for the delivery through the conduit means of the fluid toward the vaporizing means and for the passage therefrom of the vapor to the one containing means, respectively.

38. An actuating system as set forth in claim 37, wherein the vaporizing means includes means disposed at least generally adjacent the conduit means in heat transfer relation therewith.

39. An actuating system comprising a driven device, a pair of means for containing a vaporizable fluid and generally in open fluid communication with each other, means disposed within one of the containing means for partitioning a portion thereof from another portion of the one containing means, means for communicating the fluid in the partitioned portion of the one containing means with the fluid in the other portion thereof, means for vaporizing only the fluid in the partitioned portion, the vapor created upon the vaporization of only the fluid in the partitioned portion by the vaporizing means acting on the fluid to effect a flow of at least a part thereof from the other portion into the partitioned portion to replenish at least in part the fluid vaporized therefrom and to effect a displacement flow of at least another part of the fluid from the one containing means to the other of the containing means, and the other containing means including means operable generally in response to the displacment flow of the at least another part of the fluid for driving the driven device.

40. An actuating system as set forth in claim 39, wherein the partitioning means comprises conduit means disposed within the one containing means generally about at least a part of the vaporizing means, the partitioned portion being generally within the conduit means adjacent the vaporizing means part and the other portion being generally without the conduit means.

41. An actuating system as set forth in claim 40, wherein the conduit means generally thermally insulates the fluid in the partitioned portion from that in the other portion.

42. An acutuating system as set forth in claim 40, whrein the conduit means includes an opening spaced below a predetermined fill level of the fluid in the one containing means and generally interconnecting partitioned portion and the other portion thereby to constitute the communicating means, the pressure of the vapor acting on the fluid to force the at least part of the fluid through the opening for effecting the replenishment of the fluid vaporized from the partitioned portion by the vaporizing means.

43. An actuating system as set forth in claim 40, wherein the conduit means includes an opening at least generally coextensive with a predetermined fill level of the fluid in the one containing means for passing the vapor from the partitioned portion.

44. An actuating system as set forth in claim 40, wherein the part of the vaporizing means is constituted by a thermal conductor mounted to the one containing means and extending into the partitioned portion in heat transfer relation with the fluid therein.

45. An actuating system as set forth in claim 44, wherein the vaporizing means includes means for heating the thermal conductor.

46. An actuating system as set forth in claim 45, wherein the heating means comprise a PTCR disposed in heat transfer relation with the thermal conductor exteriorly of the one containing means.

47. An actuating system as set forth in claim 40, wherein the conduit means is generally loosely mounted about the at least part of the vaporizing means, and an end portion on the conduit means for seating engagement on an adjacent part of the one containing means and defining therewith the communicating means.

48. An actuating system as set forth in claim 39, wherein the one containing means includes a sidewall, and a duct generally constituting the partitioning means mounted to the sidewall and defining therewith the partitioned portion.

49. An actuating system as set forth in claim 48, wherein the vaporizing means is mounted exteriorly of the one containing means to a part of the sidewall defining with the duct the partitioned portion, the vaporizing means being operable generally to transmit heat through the sidewall post to effect the vaporization of only the fluid within the partitioned portion.

50. A method of operating a thermal actuator having one of a pair of means for containing a vaporizable fluid adapted to be driven by it comprising the steps of:
   a. vaporizing at least a portion of the fluid generally in open fluid flow communication with means for vaporizing it; and
   b. subjecting the fluid in the other of the containing means to the vapor created during the vaporizing step for displacing the fluid from the other containing means to the one of the containing means to drive it and replenishing at least in part the liquid portion vaporized during the vaporizing step with another part of the fluid displaced from the other containing means.

51. A method of operating a thermal actuator having one of a pair of means for containing a vaporizable liquid adapted to be driven by it comprising the steps of:
   a. partitioning a portion of the liquid in the other of the containing means from the remaining liquid therein and providing fluid flow communication between the liquid portion and the remaining liquid;
   b. vaporizing at least a part of only the liquid portion; and
   c. subjecting the remaining liquid to the vapor created during the vaporizing step for displacing at least a part of the remaining liquid from the other containing means to the one of the containing means for driving it and replenishing the liquid portion with another portion of the remaining liquid to replace the at least part of the liquid portion upon the vaporization thereof during the vaporizing step.

52. The method as set forth in claim 51, wherein the amount of the other portion of the remaining liquid utilized to replenish the liquid portion is generally small with respect to the at least part of the remaining liquid displaced for driving the one containing means.

53. The method as set forth in claim 51, wherein the subjecting and replenishing step includes reducing the amount of the remaining liquid available in the other containing means for effecting the replenishment of the liquid portion generally proportionally with the amount of the at least part of the remaining liquid displaced for driving the one containing means.

54. The method as set forth in claim 51, wherein the subjecting and replenishing step includes supplying the other portion of the remaining liquid for the replenishment of the liquid portion at a rate generally proportional to the rate at which the at least part of the liquid portion is vaporized during the vaporizing step until generally the entire amount of the at least part of the remaining liquid is displaced from the other containing means.

55. The method as set forth in claim 51, wherein the vaporizing step includes communicating means for vaporizing the at least portion of only the liquid portion only with the liquid portion and isolating it generally from the remaining liquid in the other containing means.

56. The method as set forth in claim 55, wherein the vaporizing step further includes inhibiting the capacity of the vaporizing means to vaporize the at least part of the liquid portion generally in a proportion commensurate with the amount of the at least part of the remaining fluid displaced for driving the one containing means.

57. The method as set forth in claim 51, comprising the additional step of preventing surging of the at least part of the remaining liquid upon the return flow thereof from the one containing means to the other containing means in the event of the occurrence of a certain condition interrupting the vaporizing step.

58. The method as set forth in claim 51, wherein the partitioning and providing step includes disposing at least one open end of the separating means at least generally coextensive with a selected fill level of the liquid in the other containing means.

59. The method as set forth in claim 51, wherein the partitioning and providing step includes positioning within the other containing means means for generally separating the liquid portion and the remaining liquid with the at least limited communication between the remaining liquid and the liquid portion occurring through at least one open end of the separating means disposed generally beneath a selected fill level for the fluid in the other containing means.

60. The method as set forth in claim 59, comprising the preliminary step of disposing in the other containing means at least a part of means for vaporizing the liquid portion, the separating means being placed at least in part generally about a part of the vaporizing means during the partitioning and providing step.

61. A method of making means for containing a vaporizable fluid and adapted for use in a thermal actuator comprising the steps of:
   a. disposing within a chamber of the containing means means for partitioning a portion of the chamber from another portion thereof and providing at least limited fluid flow communication between the partitioned portion and the other portion generally below a selected fill level for the fluid adapted to be received in the chamber; and
   b. mounting to the containing means in a predetermined position with respect to the partitioned portion of the chamber means adapted for effecting vaporization of only the fluid received within the partitioned portion of the chamber.

62. The method as set forth in claim 61, wherein the mounting step includes extending at least a part of the vaporization effecting means into the partitioned portion.

63. The method as set forth in claim 61, wherein the mounting step includes attaching the vaporization effecting means in heat transfer relation to a wall of the containing means exteriorly of the chamber so that heat may be transferred therefrom through the wall generally only to the fluid received within the partitioned portion of the chamber.

64. A method of making means for containing a vaporizable fluid and adapted for use in a thermal actuator comprising the steps of:
   a. mounting to the containing means means for vaporizing the fluid adapted to be received in a chamber of the containing means with at least a part of the vaporizing means extending into the chamber; and
   b. disposing within the chamber generally loosely about the at least part of the vaporizing means therein means for partitioning a portion of the chamber from another portion thereof and for providing flow communication for the fluid adapted to be received in the chamber between the partitioned portion and the other portion thereof generally below a selected fluid fill level for the containing means.

* * * * *

UNITED STATES PATENT OFFICE
CERTIFICATE OF CORRECTION

PATENT NO. : 3,932,994
DATED : January 20, 1976
INVENTOR(S) : Paige W. Thompson

It is certified that error appears in the above-identified patent and that said Letters Patent are hereby corrected as shown below:

Col. 1, line 6, delete "application" and insert --applications--;
line 28, delete "liqid" and insert --liquid--;
line 34, delete "operated" and insert --operate--;
line 48, after "and" insert --the--;
line 49, delete "liuqid" and insert --liquid--;
line 58, delete "Amoung" and insert --Among--.

line 19, delete "deleivered" and insert --delivered--;
line 23, delete "delevered" and insert --delivered--;
line 49, delete "cominication" and insert --communication--;
line 52, after "created" insert --during--.
Col. 4, line 1, delete "vapaor" and insert --vapor--;
line 19, delete "partioned" and insert --partitioned--;
line 44, delete "metnod" and insert --method--.
Col. 5, line 22, delete "the";
line 23, delete "ther" and insert --the--;
line 52, delete "anad" and insert --and--.
Col. 6, line 33, delete "liuid" and insert --liquid--;
line 66, delete "communcates" and insert --communicates--.
Col. 7, line 37, delete "corresponing" and insert --corresponding--;
line 55, delete "estabish" and insert --establish--.
Col. 8, line 56, delete "Vaproizing" and insert --Vaporizing--.
Col. 9, line 2, delete "sititutes" and insert --stitutes--;
line 2, delete "partioning" and insert --partitioning--;
line 12, delete "aabove" and insert --above--;
line 30, delete "than" and insert --that--;
line 30, delete "eqivalent" and insert --equivalent--;

UNITED STATES PATENT OFFICE
CERTIFICATE OF CORRECTION

PATENT NO. : 3,932,994
DATED : January 20, 1976
INVENTOR(S) : Paige W. Thompson

It is certified that error appears in the above-identified patent and that said Letters Patent are hereby corrected as shown below:

Col. 9, line 41, after "thermal" insert --actuator--;
         line 65, after "bellows 3" insert --and--.
Col. 10, line 4, delete "estabish" and insert --establish--.
Col. 11, line 7, delete "liauid" and insert --liquid--;
         line 46, delete "scop" and insert --scope--;
         line 53, delete "setps" and insert --steps--;
         line 54, delete "deliving" and insert --delivering--.
Col. 12, line 54, after "of" insert --the--;
         line 54, delete "displace-";
         line 55, delete "ment";
         line 62, delete "displacemtn" and insert --displace-ment--.
Col. 13, line 12, delete "communcating" and insert --communicating--;
         line 43, delete "communcating" and insert --communicating--;
         line 52, delete "communciated" and insert --communicated--;
         line 63, delete "taing" and insert --taining--.
Col. 14, line 24, delete "effecing" and insert --effecting--;
         line 46, delete "partioning" and insert --partitioning--;
         line 67, delete "wheren" and insert --wherein--.
Col. 15, line 19, delete "communciating" and insert --communicating--,
Col. 16, line 16, delete "whrein" and insert --wherein--.

Signed and Sealed this

Twenty-first Day of September 1976

[SEAL]

Attest:

RUTH C. MASON
Attesting Officer

C. MARSHALL DANN
Commissioner of Patents and Trademarks